US009016789B2

(12) United States Patent
Römer et al.

(10) Patent No.: US 9,016,789 B2
(45) Date of Patent: Apr. 28, 2015

(54) VEHICLE SEAT

(71) Applicant: Faurecia Autositze GmbH, Stadthagen (DE)

(72) Inventors: Bernd Römer, Ludwigsburg (DE); Jong-Seok Yun, Gyeonggi-do (KR)

(73) Assignee: Faurecia Autositze GmbH, Stadthagen (DE)

( * ) Notice: Subject to any disclaimer, the term of this patent is extended or adjusted under 35 U.S.C. 154(b) by 110 days.

(21) Appl. No.: 13/858,744

(22) Filed: Apr. 8, 2013

(65) Prior Publication Data
US 2013/0264854 A1    Oct. 10, 2013

(30) Foreign Application Priority Data

Apr. 7, 2012   (DE) .......................... 10 2012 008 533
Mar. 15, 2013  (DE) .......................... 10 2013 102 673

(51) Int. Cl.
*B60N 2/12*   (2006.01)
*B60N 2/30*   (2006.01)

(52) U.S. Cl.
CPC ............... *B60N 2/12* (2013.01); *B60N 2/3031* (2013.01); *B60N 2/3065* (2013.01)

(58) Field of Classification Search
CPC ....... B60N 2/12; B60N 2/3031; B60N 2/3065
USPC ................................................. 297/340, 341
See application file for complete search history.

(56) References Cited

U.S. PATENT DOCUMENTS

| 4,241,894 A | 12/1980 | Okuyama |
| 4,312,537 A | 1/1982 | Lindenberg .................... 297/317 |
| 4,787,674 A | 11/1988 | Inaba et al. .................... 297/317 |
| 4,863,209 A | 9/1989 | Deegener ..................... 296/68.1 |

(Continued)

FOREIGN PATENT DOCUMENTS

| DE | 66 01 250 U | 2/1969 |
| DE | 29 14 780 A1 | 10/1979 |

(Continued)

OTHER PUBLICATIONS

German Office Action in German Priority Application No. 10 2012 008 533.8, filed Apr. 7, 2012, Office Action dated Dec. 11, 2012 (5 pages).

(Continued)

*Primary Examiner* — Anthony D Barfield
(74) *Attorney, Agent, or Firm* — Shlesinger, Arkwright & Garvey LLP

(57) ABSTRACT

Vehicle seat has at least a front foot, a rear foot, a four-link configuration having four link parts coupled to one another via hinge points, and a compensation spring. Front foot and rear foot are accommodated in a longitudinal rail in a longitudinally adjustable manner, and the rear foot is releasable from the longitudinal rail after unlocking. Vehicle seat is movable forward from a seating position having a locked rear foot, after rear foot is unlocked, into a functional position with adjustment of four-link configuration, and with at least temporary assistance from the compensation spring. Vehicle seat has a support rod which is adjustably accommodated on the four-link configuration, and in the forward functional position the support rod comes into contact in front of the front foot, and in particular on the longitudinal rail.

19 Claims, 4 Drawing Sheets

(56) References Cited

U.S. PATENT DOCUMENTS

| | | | |
|---|---|---|---|
| 5,358,308 A | 10/1994 | Judic et al. ............... 297/316 |
| 6,152,533 A | 11/2000 | Smuk ...................... 297/341 |
| 6,183,032 B1 | 2/2001 | Champ ................. 296/65.03 |
| 6,543,848 B1 | 4/2003 | Suehiro et al. | |
| 6,578,917 B1 | 6/2003 | Aubert et al. ............ 297/317 |
| 6,679,536 B1 | 1/2004 | Sonnenberg et al. ..... 296/65.09 |
| 6,805,406 B1 | 10/2004 | Jansen .................... 297/328 |
| 6,899,392 B1 | 5/2005 | Saberan et al. ........... 297/334 |
| 6,932,409 B2 | 8/2005 | Falchero et al. ........ 296/65.09 |
| 7,152,921 B2 | 12/2006 | Saberan ................... 297/336 |
| 7,172,253 B2 | 2/2007 | Haverkamp | |
| 7,172,255 B2 | 2/2007 | Wanke | |
| 7,273,243 B2 | 9/2007 | Prugarewicz | |
| 7,390,059 B2 | 6/2008 | Brockschnieder et al. | |
| 7,390,063 B2 | 6/2008 | Behrens | |
| 7,393,056 B2 | 7/2008 | O'Connor .............. 297/378.12 |
| 7,410,219 B2 | 8/2008 | Kraft et al. | |
| 7,413,251 B2 | 8/2008 | Link ....................... 297/334 |
| 7,416,254 B2 | 8/2008 | Jennings | |
| 7,425,038 B2 | 9/2008 | Deptolla | |
| 7,461,900 B2 | 12/2008 | Lange | |
| 7,479,749 B2 | 1/2009 | Gerding et al. | |
| 7,490,900 B2 | 2/2009 | Szczudrawa | |
| 7,506,939 B2 | 3/2009 | Brockschnieder et al. | |
| 7,517,022 B2 | 4/2009 | Habedank et al. | |
| 7,673,944 B2 | 3/2010 | Behrens | |
| 7,746,011 B2 | 6/2010 | Gerding et al. | |
| 8,313,144 B2 * | 11/2012 | Holdampf ................ 297/340 |
| 8,388,065 B2 | 3/2013 | Harden ................... 297/317 |
| 8,474,910 B2 | 7/2013 | Kammerer ............... 297/334 |
| 8,602,495 B2 | 12/2013 | Jeong et al. .............. 297/334 |
| 8,950,782 B2 | 2/2015 | Dobruia et al. | |
| 2006/0138839 A1 * | 6/2006 | Ryan et al. ............... 297/340 |
| 2007/0138847 A1 | 6/2007 | Gundall et al. | |
| 2011/0037304 A1 * | 2/2011 | Kammerer ............ 297/340 X |
| 2013/0285428 A1 | 10/2013 | Livesey et al. ........... 297/317 |

FOREIGN PATENT DOCUMENTS

| | | |
|---|---|---|
| DE | 40 10 451 A1 | 10/1991 |
| DE | 698 35 019 T2 | 11/2006 |
| DE | 10 2005 060 444 A1 | 6/2007 |
| DE | 20 2010 004 599 U1 | 7/2010 |

OTHER PUBLICATIONS

Aug. 19, 2013 Office Action in German Application No. 10 2013 102 673.7, filed Mar. 15, 2013, A German Priority Application for U.S. Appl. No. 13/858,744 (6 pp.).

Dec. 29, 2013 Office Action in KR Appl. No. 2013-0036499, filed Apr. 3, 2013, equivalent to DE 10 2013 102 673.7, filed Mar. 15, 2013, DE priority of U.S. Appl. No. 13/858,74 (7 pp.).

* cited by examiner

VEHICLE SEAT

CROSS-REFERENCE TO RELATED APPLICATIONS

This application claims the priority of German patent application no. 10 2013 102 673.7, filed Mar. 15, 2013, and this application claims the priority of German patent application no. 10 2012 008 533.8, filed Apr. 7, 2012, and each of which is incorporated herein by reference.

This application relates to applicant's concurrently filed U.S. application Ser. No. (applicant's ref. 7884).

FIELD OF THE INVENTION

The invention relates to a vehicle seat having a front foot, a rear foot, a four-link configuration having four link parts which are coupled to one another via four hinge points, and a compensation spring

BACKGROUND OF THE INVENTION

These types of vehicle seats allow on the one hand a longitudinal adjustment on a longitudinal rail, and on the other hand, an adjustment between a seating position and a completely or partially folded forward functional position, which may be a cargo or easy entry position, for example.

For this purpose, the vehicle seat has a four-link configuration having four link parts and four hinge points which connect the link parts. An angled seat part and a backrest part, for example, are generally provided as link parts, the seat part being provided for accommodating a seat cushion, which may also be supported on the lower area of the backrest part. The backrest part may represent the entire backrest or a lower portion of the backrest. In these types of articulated structures, for example a lower receiving part, which is generally rigidly coupled to a front foot or which itself represents the front foot, and a coupling rocker between the receiving part and the backrest part, for example, are used as additional link parts.

In addition to its front foot, the vehicle seat is generally accommodated with a rear foot in the longitudinal rail, whereby, for example, the front foot may be lockable in the longitudinal positions. The rear foot is accommodated with a locking apparatus on the longitudinal rail, which may be unlocked for folding or pivoting forward.

The pivot motion from the seating position initially leads in a first upward partial path into a middle position, and is generally assisted by a compensation spring so that the user does not have to overcome the entire weight of the seat. This is followed by a further partial path into the functional position, which may occur completely or partially automatically, for example.

For this purpose, the compensation spring is provided between two parts of the four-link configuration, for example between the coupling rocker and a suitable location on the seat part, and is already tensioned in the seating position.

However, production-related tolerances in the individual components, in particular also the front foot and rear foot and their locking apparatuses, generally result in a certain play in the individual parts of the four-link configuration. In particular, the action of the compensation spring results in twisting of the link parts of the four-link configuration having tolerances. This may cause, for example, twisting of the feet in the longitudinal rail, in particular also tilting of the rear foot in the longitudinal rail, for example. Such tilting of the feet may result in interfering resistance during the longitudinal adjustment and in the sliding motion, and the seat may jerk and become jammed.

OBJECTS AND SUMMARY OF THE INVENTION

An object of the invention is to provide a vehicle seat which provides ease of operation and reliable adjustability between the positions.

This object is achieved by a vehicle seat according to claim 1. The subclaims describe preferred further embodiments.

Thus, according to the invention a support rod is provided which is adjustably accommodated on the four-link configuration. In the front functional position, the support rod comes into contact in front of the front foot. This contact may occur in particular on the longitudinal rail.

The support rod is preferably hinged to the lower backrest part, and also is preferably forcibly guided on the seat part.

According to one preferred embodiment, the support rod is forcibly guided in an elongated hole-bolt engagement.

The invention thus provides and makes possible several advantages:

In the functional position, further support is provided by the support rod in addition to the front foot, thus stabilizing the position. There is high resistance to acceleration forces in the direction of longitudinal acceleration, i.e., in the event of acceleration or a rear-end collision, and also in a braking operation or a front-end collision.

The forcible guiding makes possible a defined adjustment without significant rattling. A defined positioning of the support rod is made possible. The support rod may thus be moved into a position, also in the normal use situation, which does not interfere, and which possibly even has a stabilizing effect.

There is preferably no jamming or locking of the link parts of the four-link configuration with respect to one another; high stability is already achieved by the support rod. Thus, a lock-free form of the link parts of the four-link configuration with respect to one another is present.

As the lower link part, a receiving part is advantageously provided which is not a part of the front foot or rigidly coupled to the front foot, but, rather, is hinged to the front foot. The receiving part thus has a hinge point having the seat part, for example, and another hinge point having the coupling rocker, in addition to a hinge point for a small pivot motion on the front foot. In particular a very small angular range of the pivot motion on the front foot of less than 5°, preferably less than 1°, may thus be provided. For this purpose, the receiving part advantageously has a rear and a front contact surface by means of which the receiving part in each case comes to rest on the longitudinal rail at the end of an angular range, or also on the front foot. The receiving part may thus in particular also be angled or curved.

Rattling of the four-link configuration, in particular also of the rear and/or front lock(s) on the longitudinal rail, may thus be effectively prevented. However, no tilting or jamming in the longitudinal rail occurs.

This stability is improved due to the receiving part, since the receiving part is able to absorb force via its contact surface or in addition to the front foot.

The invention is explained in greater detail below with reference to the appended drawings, in which:

DETAILED DESCRIPTION OF THE INVENTION

Figure 1:
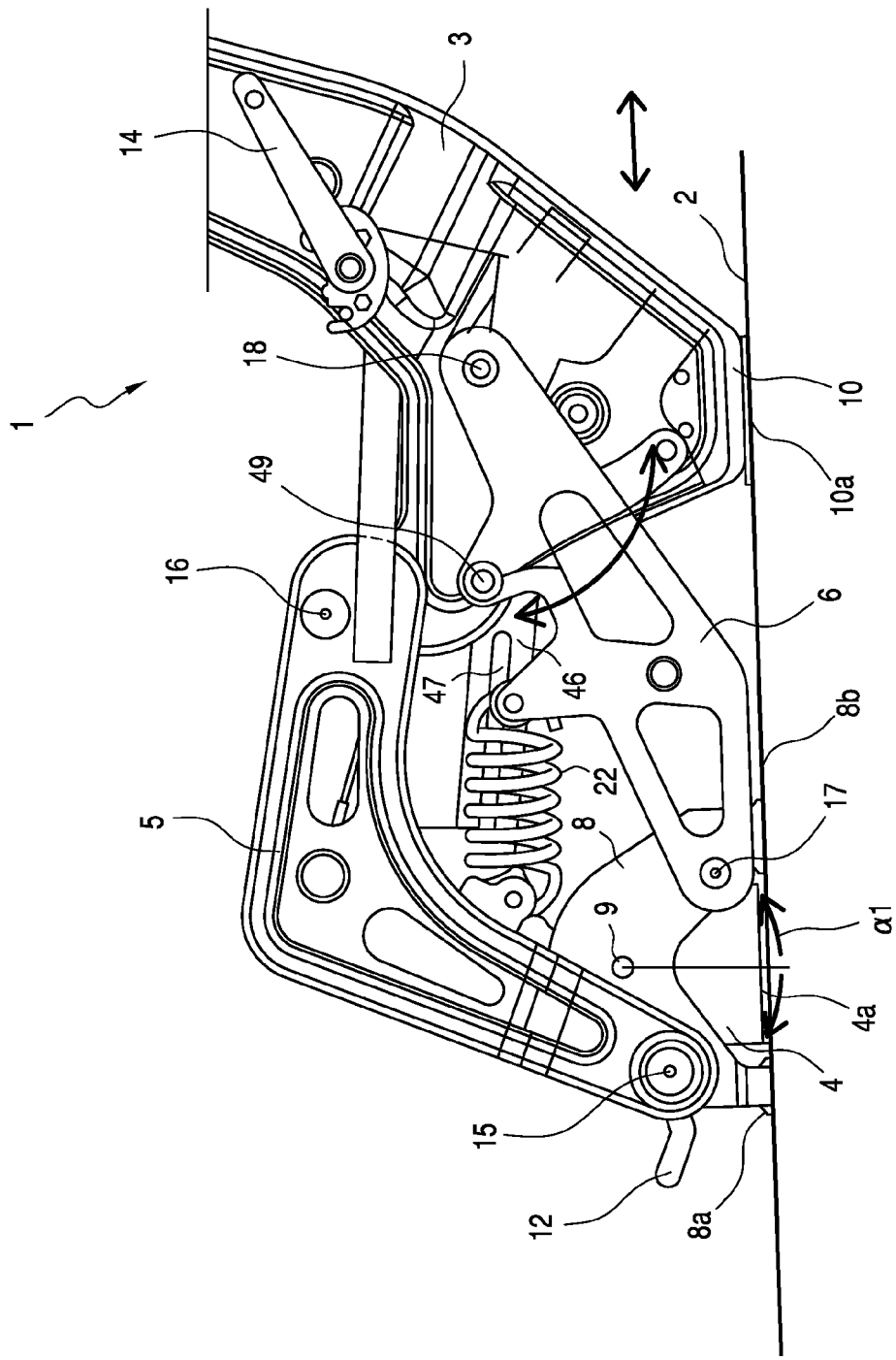
FIG. 1 shows a vehicle seat according to the invention in the seating position.
Figure 2:
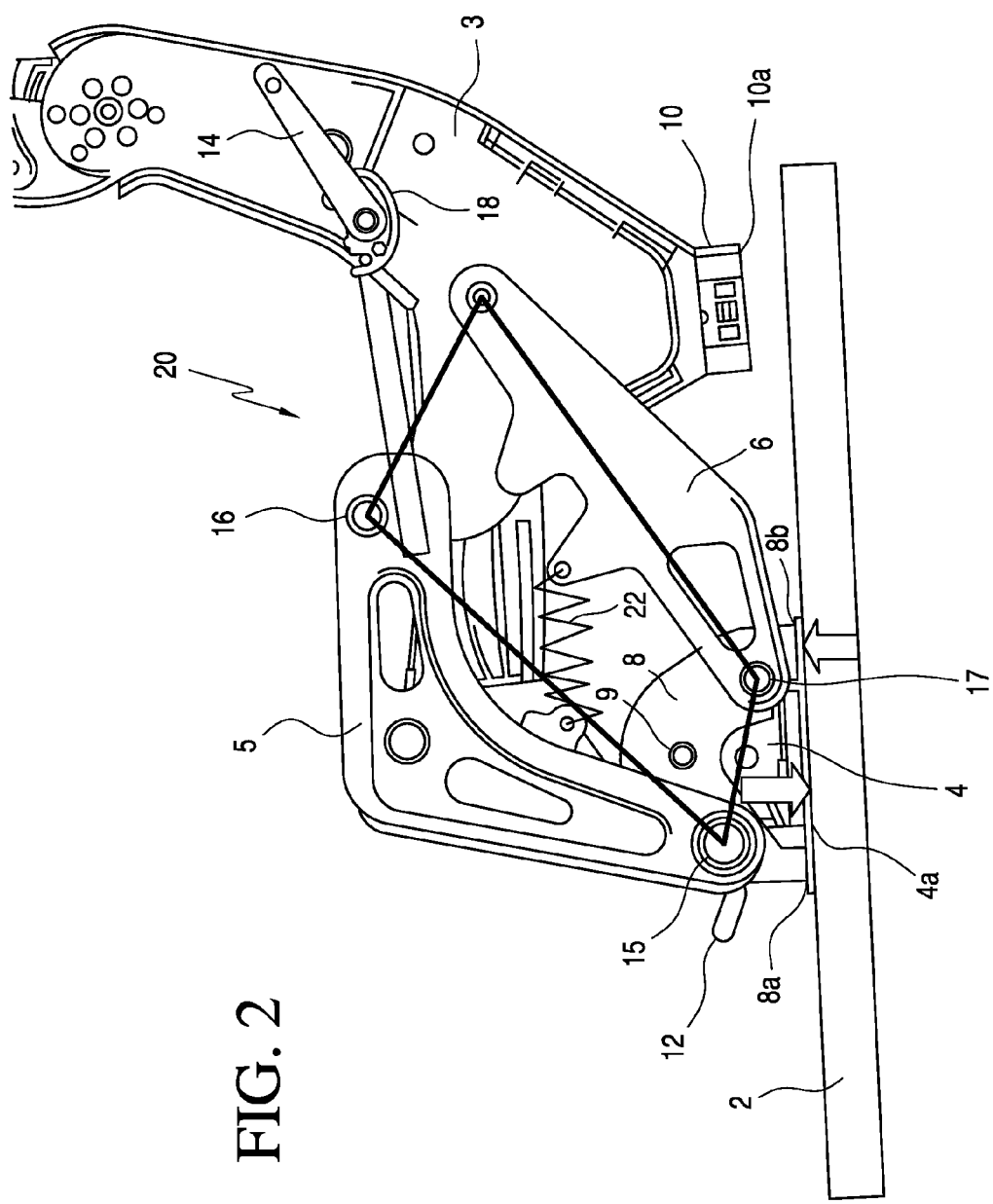
FIG. 2 shows the inventive vehicle seat of FIG. 1 after the rear foot has been unlocked and forward folding has begun.
Figure 3:
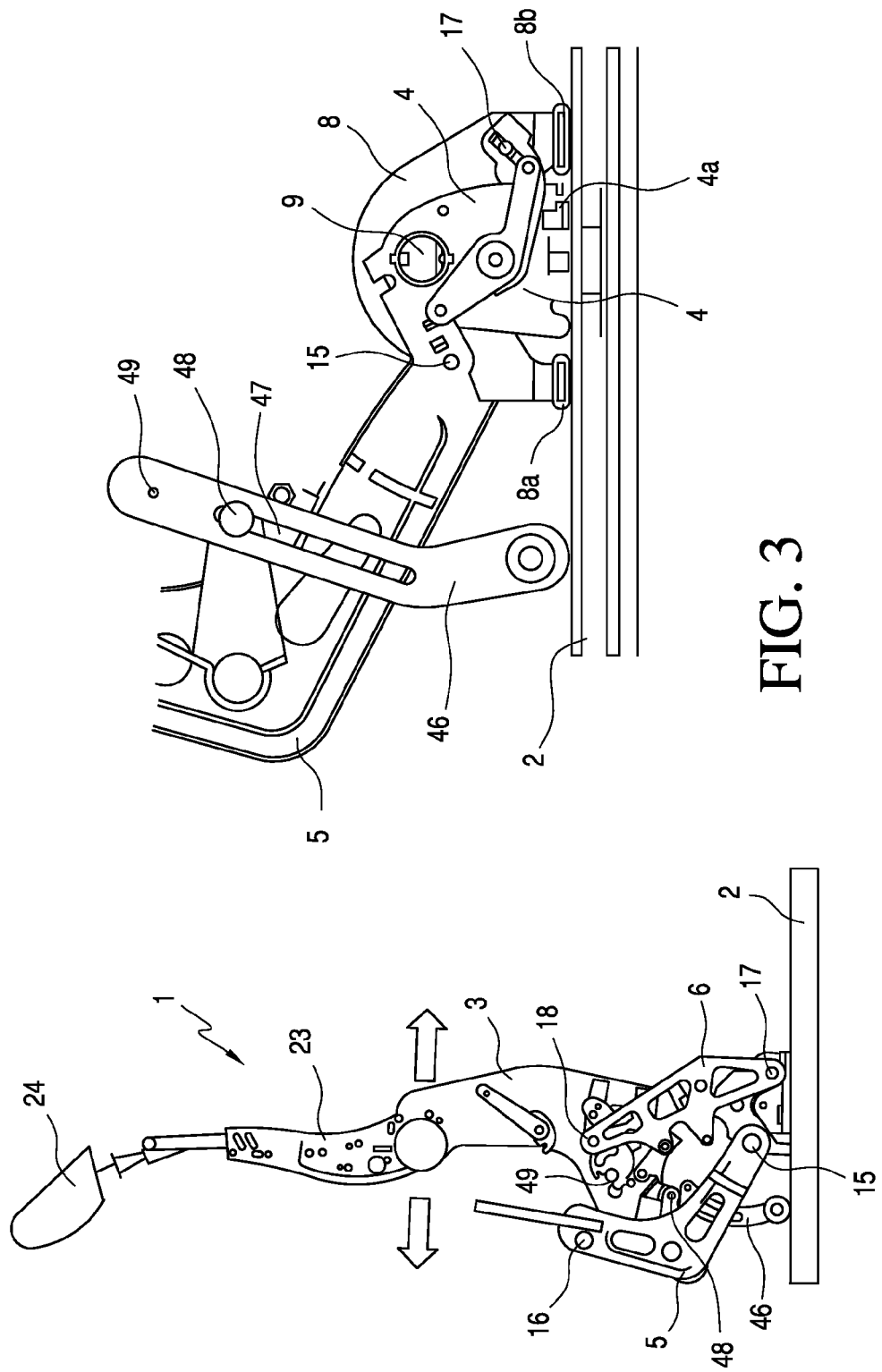
FIG. 3 shows the vehicle seat in the completely forward-folded functional position.
Figure 4:
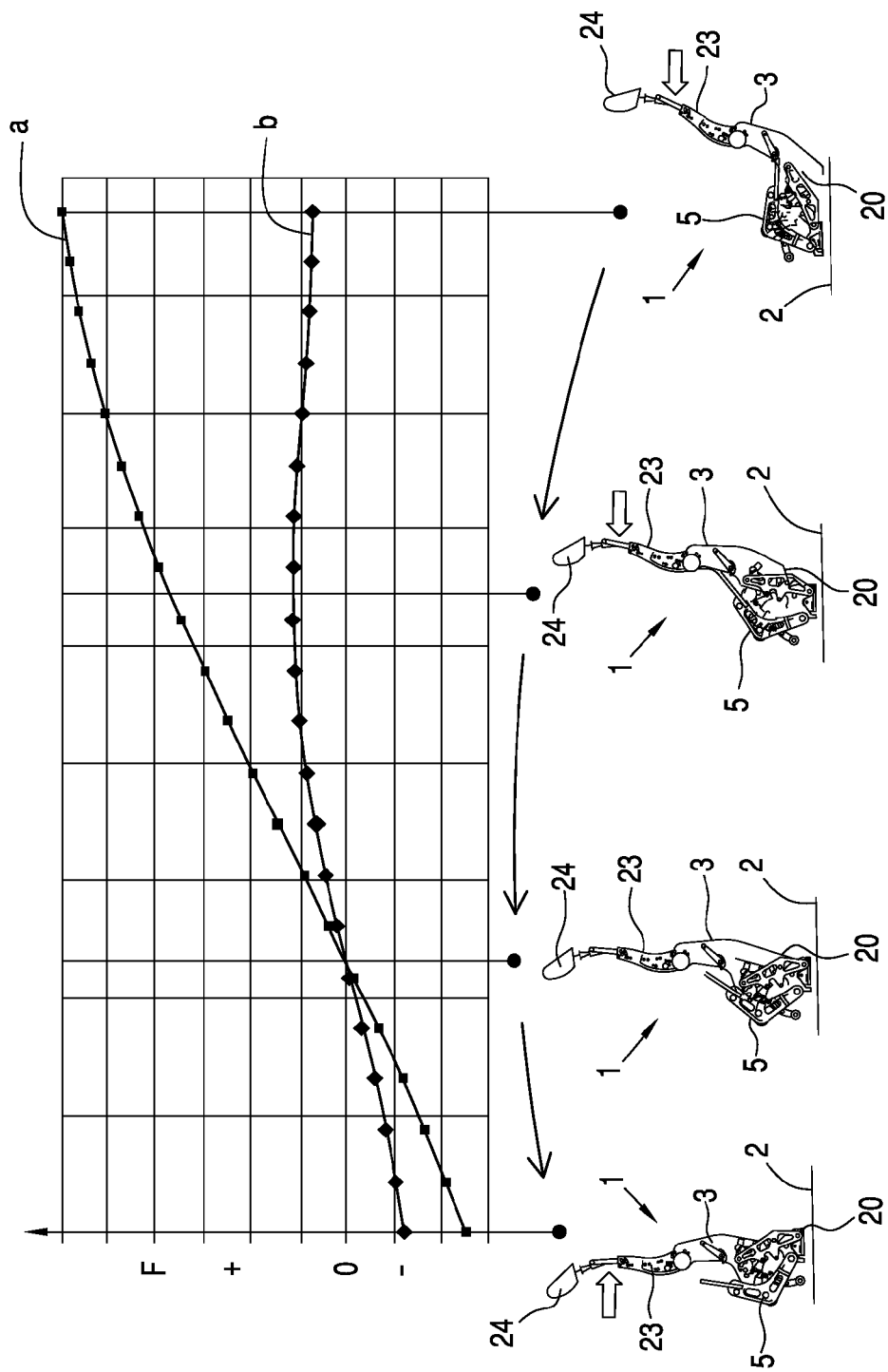
FIG. 4 shows the adjustment of the vehicle seat from the seating position into the functional position, together with a diagram illustrating the operating force to be applied, with and without a compensation spring in the positions.

A vehicle seat 1 according to the invention is illustrated only partially in FIGS. 1 and 2, and is illustrated completely in FIGS. 3 and 4, for example. The vehicle seat 1 is longitudinally adjustable on a longitudinal rail 2, and is lockable in each of its longitudinal positions. According to FIG. 4 the vehicle seat 1 is adjustable between a seating position shown in FIG. 1 and a functional position shown in FIG. 3; in principle, these various positions may be assumed in any longitudinal position if the vehicle seat 1 at this location is not prevented from being adjusted, for example by another seat or an object.

The vehicle seat 1 according to the invention has a lower backrest part 3, a front foot 4, a seat part 5, and a coupling rocker 6. On the front foot 4 a receiving part 8 is mounted so as to be pivotable at a pivot point 9. A rear foot 10 is formed at the lower end of the lower backrest part 3. The front foot 4 is lockable in the longitudinal rail 2 via a locking apparatus 4a, not illustrated here in greater detail, and is unlockable by an unlocking lever 12 to be activated by the driver, so that after the unlocking, the entire vehicle seat 1 is adjustable in the longitudinal direction. The rear foot 10 is releasably locked in a locking apparatus 10a which is unlockable by a second unlocking lever 14 in order to pivot the lower backrest part 3 upwardly after the unlocking.

The seat part 5 is hinged to the receiving part 8 at a first, lower hinge point 15, and is hinged to the lower backrest part 3 at a second, upper hinge point 16; the coupling rocker 6 is hinged to the receiving part 8 at a third, lower hinge point 17, and is hinged to the lower backrest part 3 at a fourth, upper hinge point 18. A four-link configuration 20 is thus provided, having the following four link parts: backrest part 3, seat part 5, coupling rocker 6, and receiving part 8, as well as the hinge points 15, 16, 17, 18, as is also apparent in particular from FIG. 2.

Thus, after the rear foot 10 has been unlocked, according to FIG. 2 the lower backrest part 3 is pivoted upwardly and forward, with guiding by the four-link configuration 20. Since the receiving part 8 is not fixed to the front foot 4, but, rather, is pivotable about its hinge point 9 in an angular range of $\alpha 1 = 0.7°$, for example, there is no fixed coupling of the four-link linkage 20 on the front foot 4.

Between the seat part 5 and the coupling rocker 6, a compensation spring 22 is suspended as a pretensioned tension spring, and thus pulls the quadrangle, i.e., the four-link linkage 20, shown in FIG. 2 upwardly into the upright position; the compensation spring 22 thus acts in such a way that the coupling rocker 6 is pivoted upwardly about its hinge point 17. The compensation spring 22 is thus used for partial compensation of the inherent weight of the vehicle seat 1, and thus simplifies the adjustment motion by the user according to FIG. 4, from the seating position shown at the right into the functional position, as is also apparent in particular from the diagram in FIG. 4. The diagram schematically shows the force to be applied by the user by pushing the top backrest 23 forward from the rear, on the one hand in the curve a without the compensating effect of the compensation spring 22, and on the other hand in the curve b with this compensating effect of the compensation spring 22. An upper backrest part 23 is mounted on the lower backrest part 3, for example in an adjustable articulated joint, or in a rigid manner. The user thus pushes with a force F on the upper backrest part 23, for example at the upper edge thereof beneath a headrest 24, thus pivoting the four-link linkage 20 upwardly and forward according to the quadrangle illustrated in FIG. 2.

The lower curve b in the diagram in FIG. 4 shows that the force F to be applied by the user, from the seating position on the right into the subsequent intermediate position and the subsequent (third from the right) middle position of the vehicle seat 1, remains essentially constant, and drops to zero only as the middle position is approached. In contrast, without compensation a very high force F must be applied, which subsequently drops steeply toward the middle position.

Going further from the middle position into the functional position shown at the far left in FIG. 4, in both curves the algebraic sign of the force reverses; i.e., the vehicle seat is automatically moved into the functional position, since in this case its center of gravity drops; the compensation spring 22 acts approximately in the opposite direction, so that arrival in the functional position, i.e., the locking, also causes a slight deceleration. Thus, upon the subsequent resetting from the functional position shown at the left in FIG. 4 into the middle position, it is once again necessary for the user to apply the appropriate force, whereupon the seat is subsequently automatically placed in the functional position.

The compensation spring 22 assists with the force to be applied by the user by means of a small lever length, i.e., close to the joints 15, 17; the compensation spring 22 should therefore be formed with a correspondingly large elastic force, and already acts in the locked seating position in FIG. 1. Since all parts of the vehicle seat are engineered with production-related tolerances, this force by the compensation spring 22 also causes twisting or tilting of the components with respect to one another, which, depending on the tolerance, may initially also result in jamming of the front foot 4 and/or the rear foot 10 in the longitudinal rail 2.

In the two end positions, i.e., the seating position in FIG. 1 and the functional position in FIG. 3, stable positions are achieved.

To this end, in FIG. 3 a support rod 46 comes to rest on the base, i.e., the longitudinal rail 2, in front of the front foot 4. The support rod 46 has an elongated hole 47 in which a bolt 48 of the seat part 5 is accommodated in a longitudinally adjustable manner; in addition, the support rod 46 is hinged at a link part 49 of the lower backrest part 3; this link part 49 is apparent in FIGS. 1 and 3, and otherwise is partially concealed in the figures. Thus, when the four-link linkage 20 is adjusted according to the transition from FIG. 1 to FIG. 3, the link part 49 and the elongated hole guide result in forcible guiding of the support rod 46, which in the front position in FIG. 3 causes the support rod 46 to rest on the base, i.e., the longitudinal rail.

In the functional position in FIG. 3, further support and thus stabilizing of the position are achieved by the support rod 46 in addition to the front foot 4. There is high resistance to the force of acceleration in the direction of longitudinal acceleration, i.e., in the event of an acceleration or a rear-end collision, and also in a braking operation or a front-end collision. This stability is improved due to the receiving part 8, since the receiving part 8 is able to absorb forces via its contact surface 8a or 8b in addition to the front foot 4.

Acceleration forces of 1 g (gravitational force) in each case may be captured in any direction. The support rod 46 loses contact with the longitudinal rail 2 only upon acceleration forces of 1 g from the front.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. Vehicle seat, comprising:
   a) a front foot, a rear foot, a four-link configuration having four link parts which are coupled to one another via four hinge points, and a compensation spring;
   b) the front foot and the rear foot being accommodated in a longitudinal rail in a longitudinally adjustable manner, and the rear foot being releasable from the longitudinal rail after unlocking;
   c) the vehicle seat being movable forward from a seating position having a locked rear foot, after the rear foot is unlocked, into a forward functional position with adjustment of the four-link configuration, and with at least temporary assistance from the compensation spring; and
   d) a support rod being provided which is adjustably accommodated on the four-link configuration, and in the forward functional position the support rod comes into contact in front of the front foot, and the support rod coming into contact on the longitudinal rail.

2. Vehicle seat according to claim 1, wherein:
   a) one of the four link parts is a lower backrest part, and the support rod is hinged to the lower backrest part.

3. Vehicle seat according to claim 2, wherein:
   a) after the rear foot of the vehicle seat is unlocked from the longitudinal rail by the user, the vehicle seat is forwardly pivotable by a force in the forward direction, with assistance by the compensation spring, until reaching a middle position, and is subsequently automatically adjustable from the middle position into the forward functional position.

4. Vehicle seat according to claim 2, wherein:
   a) one of the four link parts is a seat part, and the support rod is forcibly guided on the seat part.

5. Vehicle seat according to claim 1, wherein:
   a) one of the four link parts is a seat part, and the support rod is forcibly guided on the seat part.

6. Vehicle seat according to claim 5, wherein:
   a) the support rod is forcibly guided in an elongated hole-bolt engagement.

7. Vehicle seat according to claim 1, wherein:
   a) no locking or jamming is provided between the link parts of the four-link configuration.

8. Vehicle seat according to claim 1, wherein:
   a) the four link parts of the four-link configuration include:
      i) a seat part, a lower backrest part, a receiving part, and a coupling rocker;
      ii) the seat part is connected to the receiving part at a first, lower hinge point and is connected to the lower backrest part at a second, upper hinge point; and
      iii) the coupling rocker is connected to the receiving part at a third, lower hinge point and is connected to the lower backrest part at a fourth, upper hinge point.

9. Vehicle seat according to claim 1, wherein:
   a) one of the four link parts is a seat part;
   b) one of the four link parts is a coupling rocker; and
   c) the compensation spring is provided between the seat part and the coupling rocker.

10. Vehicle seat according to claim 1, wherein:
    a) one of the four link parts is a receiving part; and
    b) the receiving part is directly or indirectly hinged to the front foot at a fifth hinge point and is pivotable within an angular range at the fifth hinge point; and
    c) the receiving part has contact surfaces for contact with one of the longitudinal rail and the front foot.

11. Vehicle seat according to claim 1, wherein:
    a) the front foot is lockable in at least one longitudinal position by a locking apparatus.

12. Vehicle seat according to claim 1, wherein:
    a) one of the four link parts is a lower backrest part; and
    b) the rear foot is one of formed on and rigidly mounted on the backrest part.

13. Vehicle seat according to claim 1, wherein:
    a) after the rear foot of the vehicle seat is unlocked from the longitudinal rail by the user, the vehicle seat is forwardly pivotable by a force in the forward direction.

14. Vehicle seat according to claim 1, wherein:
    a) after the rear foot of the vehicle seat is unlocked from the longitudinal rail by the user, the vehicle seat is forwardly pivotable by a force in the forward direction, with assistance by the compensation spring, until reaching a middle position, and is subsequently automatically adjustable from the middle position into the forward functional position.

15. Vehicle seat according to claim 1, wherein:
    a) one of the four link parts is a backrest part;
    b) one of the four link parts is a coupling rocker; and
    c) no locking or jamming is provided between the backrest part and the coupling rocker.

16. Vehicle seat according to claim 1, wherein:
    a) one of the four link parts is a lower backrest part; and
    b) the rear foot is mounted on the backrest part.

17. Vehicle seat according to claim 1, wherein:
    a) the support rod is forcibly guided in an elongated hole-bolt engagement.

18. Vehicle seat according to claim 17, wherein:
    a) no locking or jamming is provided between the link parts of the four-link configuration.

19. Vehicle seat according to claim 1, wherein:
    a) the front foot is lockable by a locking apparatus.

* * * * *